(12) United States Patent
Kinase et al.

(10) Patent No.: US 6,904,099 B1
(45) Date of Patent: Jun. 7, 2005

(54) DIGITAL MODULATION SIGNAL GENERATOR

(75) Inventors: Jun Kinase, Atsugi (JP); Hiroshi Saeki, Fujisawa (JP)

(73) Assignee: Anritsu Corporation, Tokyo (JP)

( * ) Notice: Subject to any disclaimer, the term of this patent is extended or adjusted under 35 U.S.C. 154(b) by 782 days.

(21) Appl. No.: 09/868,497

(22) PCT Filed: Oct. 31, 2000

(86) PCT No.: PCT/JP00/07660

§ 371 (c)(1),
(2), (4) Date: Jun. 18, 2001

(87) PCT Pub. No.: WO01/35589

PCT Pub. Date: May 17, 2001

(30) Foreign Application Priority Data

Nov. 5, 1999  (JP) .......................................... 11-315903

(51) Int. Cl.[7] .......................... H04L 27/10; H04L 27/18
(52) U.S. Cl. ...................... 375/279; 375/224; 375/279; 375/295; 375/298
(58) Field of Search ................................ 375/224, 295, 375/298

(56) References Cited

FOREIGN PATENT DOCUMENTS

| JP | 3-2716 | 1/1991 |
|---|---|---|
| JP | 5-267959 | 10/1993 |
| JP | 10-308718 | 11/1998 |
| JP | 11-112364 | 4/1999 |
| JP | 11-284672 | 10/1999 |
| JP | 11-337605 | 12/1999 |
| JP | 2000-323999 | 11/2000 |

OTHER PUBLICATIONS

K. Toda et al; "MG 3670A Development of Digital Modulation Signal Generator", Anritsu Technical No. 66, Sep. 1993; pp. 49–55.

S. Komiyama et al; "MG 3671B Digital Modulation Signal Generator", Anritsu Technical No. 74, Oct. 1997, pp. 80–88.

*Primary Examiner*—Mohammed Ghayour
*Assistant Examiner*—Juan A. Torres
(74) *Attorney, Agent, or Firm*—Frishauf, Holtz, Goodman & Chick, P.C.

(57) ABSTRACT

With respect to a digital modulation signal outputted from an output terminal, in order to enable desired carrier leak characteristics to be compatible with desired mutual modulation distortion characteristics according to a measurement object, a first level varying member is provided between an amplifier and an output terminal. In addition, a second level varying member is provided between a base band signal generator and an orthogonal modulator. The first and second level varying members are respectively set to be predetermined attenuation quantity values based on an output level value of a digital modulation signal specified by an output level specifying member and the judgment result caused by a judgment portion.

14 Claims, 10 Drawing Sheets

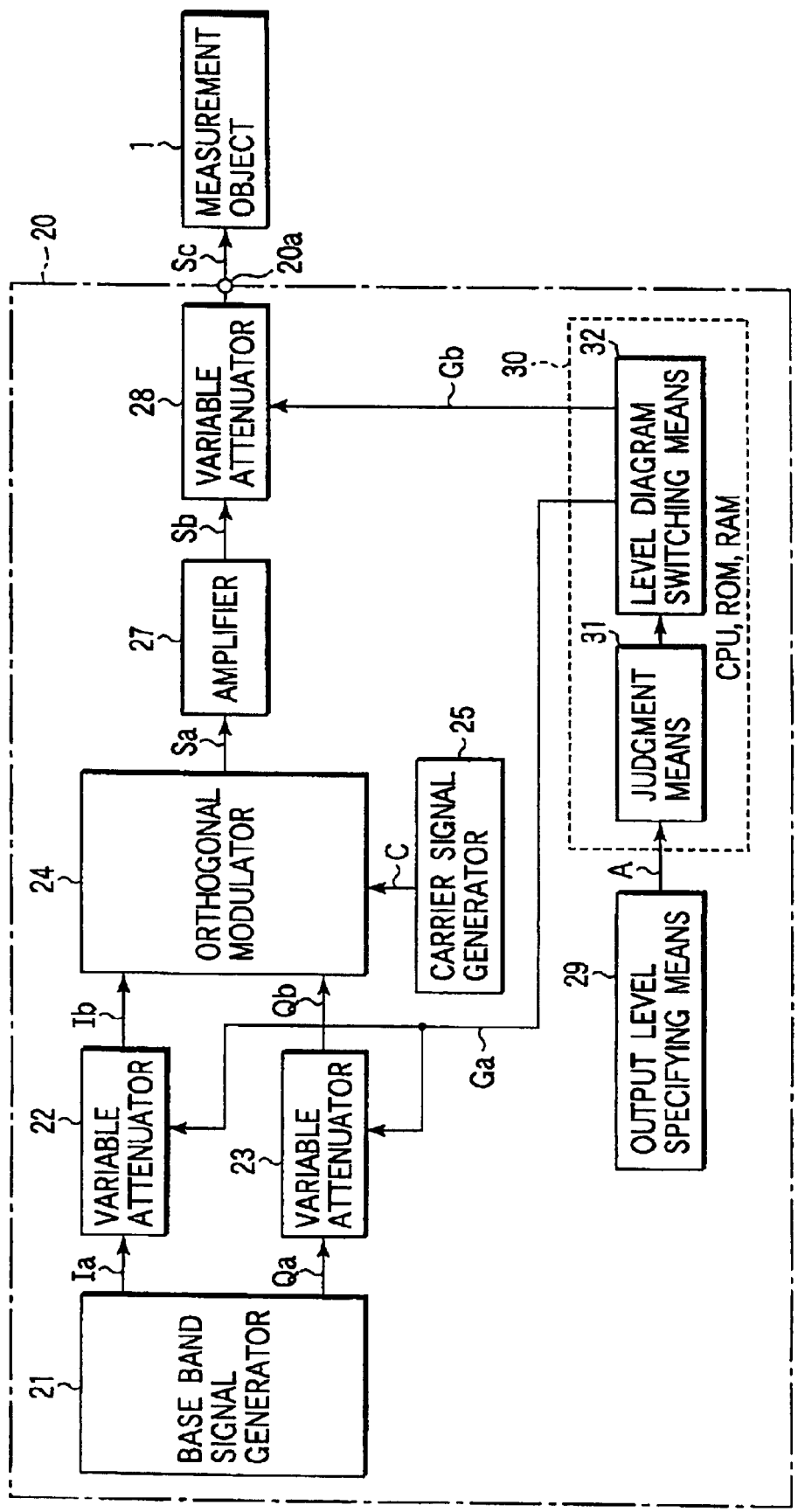
F I G. 1

| OUTPUT LEVEL SETTING (dBm) | VARIABLE ATTENUATOR (22, 23) ATTENUATION QUANTITY (dB) | VARIABLE ATTENUATOR (28) ATTENUATION QUANTITY (dB) |
|---|---|---|
| 0 | 30 | 0 |
| -1 | | 1 |
| -2 | | 2 |
| -3 | | 3 |
| ⋮ | | ⋮ |
| -48 | | 48 |
| -49 | | 49 |
| -50 | 10 | 70 |
| -51 | | 71 |
| ⋮ | | ⋮ |
| -99 | | 119 |
| -100 | | 120 |
| -101 | | 121 |
| ⋮ | | ⋮ |

FIG. 12

| OUTPUT LEVEL SETTING (dBm) | VARIABLE ATTENUATOR (22, 23) ATTENUATION QUANTITY (dB) | VARIABLE ATTENUATOR (26) ATTENUATION QUANTITY (dB) | VARIABLE ATTENUATOR (28) ATTENUATION QUANTITY (dB) |
|---|---|---|---|
| 0 | 30 | 0 | 0 |
| -1 | | | 1 |
| -2 | | | 2 |
| -3 | | | 3 |
| ⋮ | | | ⋮ |
| -48 | | | 48 |
| -49 | | | 49 |
| -50 | 0 | 20 | 60 |
| -51 | | | 61 |
| ⋮ | | | ⋮ |
| -99 | | | 109 |
| -100 | | | 110 |
| -101 | | | 111 |
| ⋮ | | | ⋮ |

FIG. 13

DIGITAL MODULATION SIGNAL GENERATOR

This application is a U.S. National Phase Application under 35 USC 371 of International Application PCT/JP00/07660 (not published in English) filed Oct. 31, 2000.

BACKGROUND OF THE INVENTION

The present invention pertains to a digital modulation signal generating apparatus. In particular, the present invention relates to a digital modulation signal generating apparatus employing a technique for performing sensitivity measurement or distortion measurement with high precision in the case where a base band signal is modulated in an orthogonal manner by means of a carrier signal, and measurement is performed by employing a signal generating apparatus for generating a digital modulation signal.

DESCRIPTION OF RELATED ART

There is well known as variety of digital signal modulation systems.

In general, as a digital signal modulation system used in a mobile communication system or the like, there is known an Orthogonal Frequency Division Multiplex modulation system (OFDM).

BRIEF SUMMARY OF THE INVENTION

This OFDM modulation system, as shown in FIG. 10, is directed to a system of transmitting modulation waves "m" each having a very low transmission rate with equal intervals in some tens to some thousands of bundles.

In order to test a communication device or circuit handling a modulation digital signal generated by such OFDM modulation system, conventionally, there are employed a digital modulation signal generating apparatus 10 configured as shown in FIG. 11 (Refer to Anritsu Technical No. 66 <September, 1993>, "MG 3670A Development of Digital Modulation Signal Generator", Anritsu Technical No. 74 <October, 1997> "MG 3671B digital modulation signal generator").

This digital modulation signal generating apparatus 10 inputs base band signals I and Q outputted from a base band signal generator 11 and a carrier signal C outputted from a carrier signal generator 12 into an orthogonal modulator 13, thereby modulating base band signals I and Q in an orthogonal manner by means of a carrier signal C.

This orthogonal modulator 13 generates a digital modulation signal Sa of a channel around a carrier frequency "fc", as shown in FIG. 10.

This digital modulation signal Sa is amplified up to a predetermined level by means of an amplifier 14, and then, the amplification output Sb is inputted to a variable attenuator 15, and is adjusted to a desired level.

The digital modulation signal Sc level adjusted at this variable attenuator 15 is outputted from an output terminal 10a.

Then, a measurement object 1 such as communication device or circuit is connected to the output terminal 10a, wherein the sensitivity characteristics or distortion characteristics of the measurement object 1 and the like are measured.

For example, in the case of measuring the sensitivity characteristics of the communication device, the attenuation quantity of the variable attenuator 15 is set to be large, and a level of the digital modulation signal Sc outputted from the output terminal 10a is set to a very low level (for example, −100 dBm), and is inputted to the measurement object 1, whereby an error rate of the demodulation signal of the measurement object 1 is measured.

In addition, in the case of measuring distortion characteristics of a circuit such as an amplifier or mixer, the attenuation quantity of a variable attenuator 15 is set to be small, and a level of the digital modulation signal Sc outputted from the output terminal 10a is set to a very high level (for example, −10 dBm), and is inputted to the measurement object 1, whereby a spectrum of an output of the measurement object 1 is observed by means of a spectrum analyzer or the like.

However, as described above, in a digital signal generating apparatus 10 for modulating base band signals I and Q by the orthogonal modulator 13 in an orthogonal manner by means of a carrier signal, and generating a digital modulation signal, a carrier signal C cannot be completely suppressed by a slight non-equivalence of the orthogonal modulator 13, and the residual carrier Ca is contained in the generated digital modulation signal Sa (this is called a carrier leak).

In the foregoing OFDM modulation system, the power of one modulation wave is as small as 1 of a component of the modulation frequency relevant to a total power of all the modulation frequencies. Thus, as shown in FIG. 10, an effect of the residual carrier Ca superimposed on one modulation wave becomes very large.

In the OFDM modulation system, in the case where a level difference α' between such one modulation wave and the residual carrier Ca is small, the modulation precision is worsened.

Thus, when this modulation wave is demodulated at the measurement object 1 such as a receiving device, there is a problem that an effect of the residual carrier Ca appears at a modulation wave, whereby the characteristics of the measurement object 1 can not be precisely measured.

In order to solve such problem, it is considered that the level of a carrier signal C inputted to the orthogonal modulator 13 is lowered, and conversely, the levels of the base band signals I and Q inputted to the orthogonal modulator 13 are increased, thereby increasing a level difference α'.

However, when the level of the carrier signal C inputted to the orthogonal modulator 13 is lowered, there occur problems such as worsened switching characteristics of the orthogonal modulator 13 or lowered gain and the like. Thus, the level of the carrier signal C cannot be set to a predetermined level or less.

In addition, when the level of the base band signals I and Q inputted to the orthogonal modulator 13 is increased, there occurs a problem that there is increased a mutual modulation distortion (mainly, third high frequency distortion) that is generated by non-linearity of the orthogonal modulator 13.

Moreover, in this case, the level of the signal inputted to an amplifier 14 is increased, and thus, the mutual modulation distortion (mainly, third high frequency distortion) generated by non-linearity of the amplifier 14 increases.

An increase in such generated mutual modulation distortion causes an occurrence of a problem that the leak power to the adjacent channels increases.

Therefore, in a conventional digital modulation signal generating apparatus, the carrier suppression characteristics of the orthogonal modulator itself are improved, and the non-linearity of the orthogonal modulator 13 and amplifier 14 is improved to the maximum.

Hence, these improvements are themselves limited. Therefore, in a conventional digital modulation signal generating apparatus, it is difficult to make the carrier leak characteristics of the generated digital modulation signal compatible with mutual modulation distortion characteristics at a high level.

DISCLOSURE OF INVENTION

The present invention has been achieved to solve the above-described conventional technical problems. It is an object of the present invention to provide a digital modulation signal generating apparatus capable of making the carrier leak characteristics of the generated digital modulation signal compatible with mutual modulation distortion characteristics.

In order to achieve the foregoing object, according to one aspect of the present invention, there is provided a digital modulation signal generating apparatus comprising:

a base band signal generator (21);

a carrier signal generator (25);

an orthogonal modulator (24) for generating a digital modulation signal of a predetermined channel that corresponds to a frequency of a carrier signal upon receipt of a base band outputted from the base band signal generator and a carrier signal outputted from the carrier signal generator;

an amplifier (27) for amplifying a digital modulation signal generated by the orthogonal modulator;

an output terminal (20a) for outputting a digital modulation signal amplified by the amplifier;

first level varying means (22, 23) provided between the base band signal generator and the orthogonal modulator, for varying a level of the base band signal, and inputting the level to the orthogonal modulator;

second level varying means (28) provided between the amplifier and the output terminal, for attenuation varying a level of an output signal of the amplifier, and outputting the level from the output terminal;

output level specifying means (29) for specifying an output level value of a digital modulation signal outputted from the output terminal;

judgment means (31) for judging whether or not an output level value of a digital modulation signal specified by the output level specifying means is higher than a predetermined value or a predetermined range; and level diagram switching means (32) for setting the first level varying means and the second level varying means so that a digital modulation signal outputted from the output terminal is set to a predetermined attenuation quantity value which makes desired carrier leak characteristics compatible with desired mutual modulation distortion characteristics, respectively, based on an output level value of a digital modulation signal specified by the output level specifying means and a judgment result caused by the judgment means.

In addition, in order to achieve the above object, according to another aspect of the present invention, there is provided a digital modulation signal generating apparatus comprising:

a base band signal generator (21);

a carrier signal generator (25);

an orthogonal modulator (24) for generating a digital modulation signal of a predetermined channel that corresponds to a frequency of a carrier signal upon the receipt of a base band signal outputted from the base band signal generator and a carrier signal outputted from the carrier signal generator;

an amplifier (27) for amplifying a digital modulation signal generated by the orthogonal modulator;

an output terminal (20a) for outputting a digital modulation signal amplified by the amplifier;

first level varying means (22, 23) provided between the base band signal generator and the orthogonal modulator, for varying a level of the base band signal, and inputting the level to the orthogonal modulator;

second level varying means provided between the orthogonal modulator and the amplifier, for attenuation varying a level of a digital modulation signal outputted from the orthogonal modulator, and inputting the level to the amplifier;

third level varying means (28) provided between the amplifier and the output terminal, for attenuation varying a level of an output signal of the amplifier, and outputting the level from the output terminal;

output level specifying means (29) for specifying an output level value of a digital modulation signal outputted from the output terminal;

judgment means (31) for judging whether or not an output level value of a digital modulation signal specified by the output level specifying means is higher than a predetermined value or a predetermined range; and level diagram switching means (32) for setting the first level varying means, the second level varying means, and the third level varying means, respectively, so that a digital modulation signal outputted from the output terminal is set to a predetermined attenuation quantity which makes desired carrier leak characteristics compatible with desired mutual modulation distortion characteristics based on an output level value of a digital modulation signal specified by the output level specifying means and the judgment result caused by a judgment means.

BRIEF DESCRIPTION OF DRAWINGS

FIG. 1 is a block diagram depicting a configuration of a first embodiment of a digital modulation signal generating apparatus according to the present invention;

FIG. 12 is a view showing a setting table for setting first level varying means and second level varying means to a predetermined attenuation quantity value such that level diagram switching means makes desired carrier leak characteristics compatible with desired mutually modulated characteristics in the first embodiment of the present invention; and FIG. 13 is a view showing a setting table for setting the first level varying means, the second level varying means, and the third level varying means, respectively to a predetermined attenuation quantity value such that level diagram switching means makes desired carrier leak characteristics compatible with desired mutually modulated characteristics, in the second embodiment of the present invention.

DETAILED DESCRIPTION OF THE INVENTION

Figure 2:
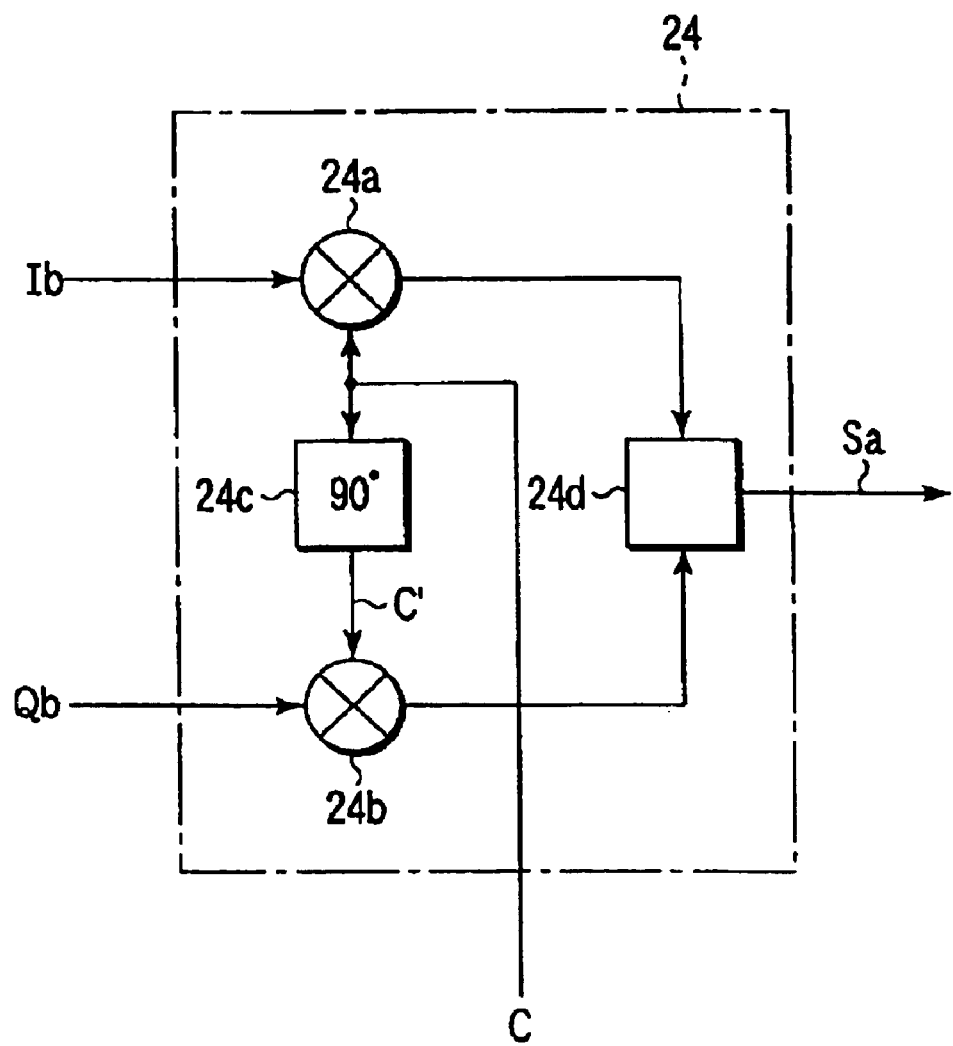
FIG. 2 is a block diagram depicting a configuration of essential portions according to the first embodiment.

Now, a principle of a digital modulation signal generating apparatus according to the present invention will be briefly described here.

In a digital modulation signal generating apparatus of such a type, good carrier leak characteristics are required when sensitivity characteristics or the like of a measurement object 1 such, as a receiving device, are measured.

That is, in the case of measuring this semiconductor's characteristics, a level of a digital modulation signal inputted to the measurement object 1 is about –100 dBm, which is very low.

In this way, in measurement in the case where an output level is low, although good carrier leak characteristics are required, mutual modulation distortion characteristics are not problematic.

In contrast, good mutual modulation distortion characteristics are required when measuring distortion characteristics or the like of the measurement object 1 such as amplifier or mixer is measured.

That is, in the case of measuring distortion characteristics or the like of this measurement object 1, a level of a digital modulation signal inputted to the measurement object 1 is about –10 dB, which is very high.

In this way, in measurement in the case where an output level is high, although good mutual modulation distortion characteristics are required, carrier leak characteristics are not problematic.

According to the present invention, as described above, attenuation is paid to the fact that the output level is low when the good carrier leak characteristics are required, and the mutual modulation distortion characteristics are not problematic; and the fact that the output level is high when the good mutual modulation distortion characteristics is required, carrier leak characteristics are not problematic.

In the present invention, in the case where the output level value of a specified digital modulation signal is low, even if the mutual modulation distortion characteristics are worsened, a level diagram inside the apparatus is set so as to improve the carrier leak characteristics.

Further in the present invention, in the case where the output level value of a specified digital modulation signal is high, even if the carrier leak characteristics are worsened, a level diagram inside the apparatus is set so as to improve the mutual modulation distortion characteristics.

In this way, in the present invention, the carrier leak characteristics and mutual modulation distortion characteristics can be compatible with each other at a high level.

Now, embodiments of the present invention based on the above principle will be described with reference to accompanying drawings.

(First Embodiment)

FIG. 1 is a block diagram depicting a configuration of a digital modulation signal generating apparatus 20 according to a first embodiment of the present invention, based on the above principle of operation.

This digital modulation signal generating apparatus 20 is adopted to output a digital modulation signal in accordance with an OFDM modulation system from an output terminal 20a as in the above described conventional digital modulation signal generating apparatus 10.

First, base band signals Ia and Qa outputted from a base band signal generator 21 are attenuated by means of variable attenuators 22 and 23 as first level varying means, and are inputted to an orthogonal modulator 24.

These variable attenuators 22 and 23 can be employed while they are connected to a variable gain amplifier or a variable attenuator and amplifier in series in the case where a level of the base band signals Ia and Qa outputted from the base band signal generator 21 is low.

In addition, the orthogonal modulator 24 orthogonally modulates base band signals Ib and Qb that have passed through the variable attenuators 22 and 23 by means of a carrier signal C outputted from a carrier signal generator 25, and generates a digital modulation signal Sa of a channel that corresponds to a frequency of the carrier signal.

This orthogonal modulator 24 consists of two mixers 24a and 24b, 90-degree phase shifter 24c, and a synthesizer 24d, as shown in FIG. 2, for example.

That is, in this orthogonal modulator 24, the base band signal Ib and carrier signal C are inputted to the mixer 24a, and the base band signal Qb and a carrier signal C' phase-shifted by 90 degrees by means of the phase shifter 24c are inputted to the mixer 24b.

Then, output signals of both of the mixers 24a and 24b are synthesized by means of a synthesizer 24d, and are outputted as a digital modulation signal Sa in accordance with an OFDM modulation system.

This digital modulation signal Sa is amplified by means of an amplifier 27, and then, the amplified output Sb is inputted to a variable attenuator 28 as second level varying means.

A digital modulation signal Sc subjected to attenuation by means of this variable attenuator 28 is outputted from an output terminal 20a.

This variable attenuator 28 is controlled in attenuation quantity by means of a control portion 30 described later in addition to the variable attenuators 22 and 23.

Output level specifying means 29 is adopted to specify an output level value A of a digital modulation signal outputted from the output terminal 20a.

The output level value A specified by this output level specifying means 29 is outputted to the control portion 30.

Here, the control portion 30 is composed of a microcomputer including CPU, ROM, RAM or the like, for example, and the attenuation quantities Ga and Gb of the variable attenuators 22, 23, and 28 are variably controlled according to the output level value A specified by the output level specifying means 29.

This control portion 30 has judgment means 31 and level diagram switching means 32.

First, the judgment means 31 judges whether or not the output level value A specified by the output level specifying means 29 is higher than a predetermined value (or predetermined range).

Then, in the level diagram switching means 32, based on the output level value A of a digital modulation signal outputted from the output terminal 20a specified by the output level specifying means 29 and the judgment result obtained by the judgment means 31, attenuation quantity of the variable attenuators 22 and 23 as the first level varying means and the variable attenuator 28 as the second level varying means are set in accordance with the level diagram setting table stored in a ROM as shown in FIG. 12 and the level diagram setting value computed based on the following formula by means of a CPU, for example, so as to be a predetermined attenuation quantity value which makes desired carrier leak characteristics compatible with desired mutual modulation distortion characteristics, respectively.

(1) The attenuation quantity of the variable attenuators 22 and 23 is in accordance with a table shown in FIG. 12.

(2) Attenuation quantity (dB) of variable attenuator 28)=−(attenuation quantity (dB) of variable attenuators 22 and 23)−(specified output level value (dBm))+30

Namely, the level diagram switching means 32 is adopted to switch the level diagram inside of the apparatus into a state in which carrier leak characteristics takes precedence over mutual modulation distortion characteristics and a state in which mutual modulation distortion characteristics takes precedence over carrier leak characteristics according to the output level value A of a digital modulation signal outputted from the output terminal 20a specified by output level specifying means 29 and the judgment result of judgment means 31.

That is, in the case where it is judged that the specified output level value A is lower than a predetermined value (or predetermined range), the control portion 30 set the attenuation quantity of the variable attenuators 22 and 23 to be small so that a level difference between a digital modulation signal of a predetermined channel outputted from the output terminal 20a and the residual carrier is equal to or larger than a predetermined value.

In addition, in this case, the control portion 30 sets an attenuation quantity of the variable attenuator 28 so that a digital modulation signal of a predetermined channel of the specified output level value A is outputted from the output terminal 20a.

In addition, in the case where it is judged that the specified output level value A is higher than a predetermined value (or predetermined range), the control portion 30 sets the attenuation quantity of the variable attenuators 22 and 23 to be large so that a level difference between a digital modulation signal of a predetermined channel outputted from the output terminal 20a and the mutual modulation distortion is equal to or larger than a predetermined value.

In addition, in this case as well, the control portion 30 sets an attenuation quantity of the variable attenuator 28 so that the digital modulation signal of a predetermined channel of the specified output level value A is outputted from the output terminal 20a.

Next, an operation of a digital modulation signal generating apparatus 20 will be specifically described by using numeric values.

The presumed numeric value is such that a level of the base band signals Ia and Qa outputted from a base band signal generator 21 is defined as 0 dBm, a level of a carrier signal outputted from a carrier signal generator 25 is defined as 10 dBm, a carrier suppression ratio of the orthogonal modulator 24 is defined as −70 dB, a gain of the orthogonal modulator 24 (a difference between a level of base band signals Ib and Qb and a level of an output signal Sa) is defined as 10 dB, and a gain of the amplifier 27 is defined as 20 dB.

In addition, the mutual modulation distortion generated by the orthogonal modulator 24 is very low when its input signal level is lower than −20 dBm, and is gradually worsened in excess of −20 dB.

Further, the mutual modulation distortion generated by the amplifier 27 is very low when its input signal level is lower than −10 dBm, and is gradually worsened in excess of −10 dBm.

Furthermore, the judgment means 31 judges whether or not the output level value A specified from the output level specifying means 29 is higher than −50 dBm which is a predetermined value.

Here, in order to perform sensitivity measurement or the like of a measurement object 1 such as a receiving device, assume that the output level value A is specified as −100 (dBm), for example, by the output level specifying means 29.

At this time, the judgment means 31 judges that the specified output level value A is lower than −50 (dBm) that is a predetermined value.

Still furthermore, a level difference (hereinafter, referred to as a carrier leak ratio) between a total level of a digital modulation signal required during measurement of such sensitivity characteristics and the residual carrier is 50 dB or more.

That a level difference between a total level and the residual carrier is secured to be 50 dB or more denotes that, in OFDM modulation of 1,000 modulation waves, for example, a level of one modulation wave is 1/1,000 of the total level, and thus, a level difference from one modulation wave superimposed on the residual carrier is ensured by 20 dB or more.

In addition, a difference between a total level of a digital modulation signal required for measurement of distortion characteristics such as an amplifier or mixer and the like and a total level of a mutual modulation distortion (hereinafter, referred to as adjacent channel leak ratio) is 70 dB or more.

Based on the above presumed numeric value, the level diagram switching means 32 sets the level diagram inside of the apparatus so that a level difference between a digital modulation signal of a predetermined channel outputted from the output terminal 20a and the residual carrier is increased, and the digital modulation signal of the output level value A specified by the output level specifying means 29 is outputted from the output terminal 20a.

Figures 3A, 3B:
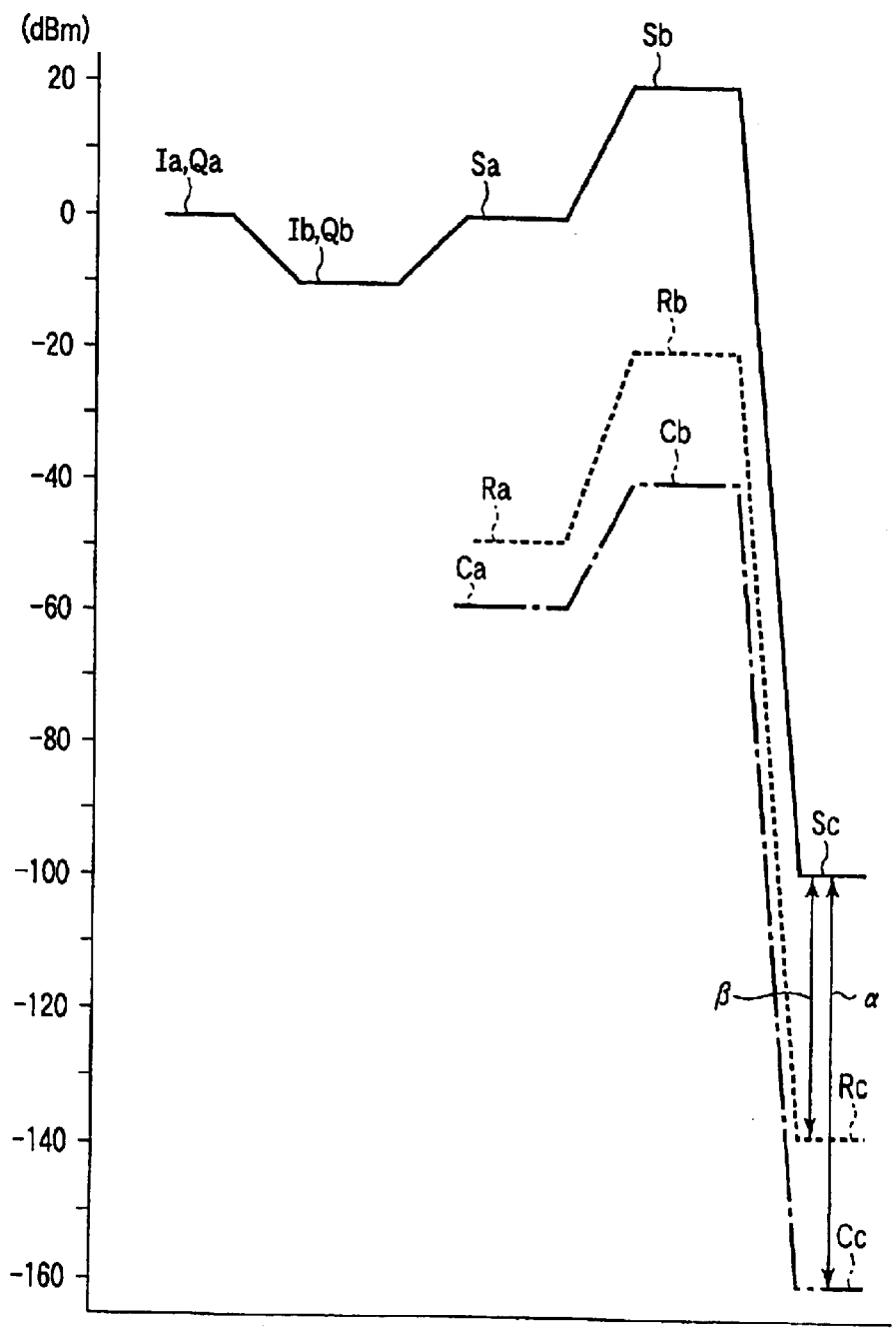
FIG. 3A and FIG. 3B are views each showing a level diagram taking carrier leak characteristics precedence over any other characteristics according to the first embodiment.

First, in the level diagram switching means 32, as shown in FIG. 3A and FIG. 3B, the attenuation quantity Ga of the variable attenuators 22 and 23 is set to 10 dB which is comparatively small, whereby the input level of the base band signals I and Q relevant to the orthogonal modulator 24 is set to −10 dBm.

In the level diagram shown in FIG. 3A and FIG. 3B, the digital modulation signal, mutual modulation distortion, and residual carrier are shown as a total level.

At this time, a total level of the digital modulation signal Sa outputted from the orthogonal modulator 24 is 0 dBm (=−10+10), and a level of the residual carrier Ca included in this signal is −60 dBm (=10−70).

This digital modulation signal Sa is amplified to 20 dBm by means of the amplifier 27, and the amplified output Sb is inputted to the variable attenuator 28.

At this time, the level diagram switching means 32 sets the attenuation quantity Gb of the variable attenuator 28 to 120 dB (=20−(−100)), whereby a level of the digital modulation signal Sc outputted from the output terminal 20a is set to −100 dBm that corresponds to the specified output level value A.

In this case, the residual carrier Ca as well as digital modulation signal Sa is amplified to −40 dBm by means of the amplifier 27, and attenuation of 120 dB is received by the variable attenuator 28. Thus, the residual carrier Cc attenuated to −160 dBm is outputted from the output terminal 20a.

Figure 4:
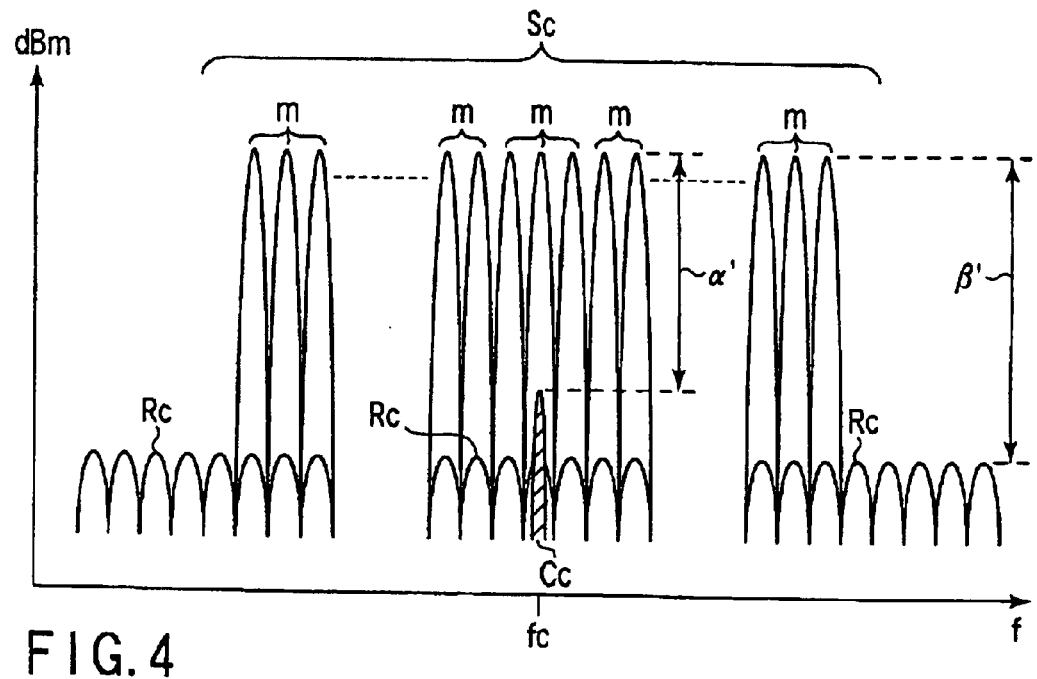
FIG. 4 is a view showing a spectrum of an output signal taking precedence over carrier leak characteristics according to the first embodiment.

In this manner, a carrier leak ratio α relevant to a total level at the output terminal 20a is 60 dB (=−100−(−160)), and a carrier leak ratio α' (See FIG. 4) relevant to a level of a modulation wave superimposed on the residual carrier Cc is 30 dB as shown in FIG. 4.

As a result, a digital modulation signal in excess of a carrier leak ratio of 50 dB relevant to a total level required for this measurement can be obtained.

Of the level diagrams shown in FIG. 3A and FIG. 3B, the level diagram from the base band signal generator 21 to an output of the amplifier 27 is such that the output level value A specified by the output level specifying means 29 does not change in a range which is lower than −50 (dBm), and changes according to the output level value A specified by the attenuation quantity of the variable attenuator 28.

Namely, in this range, the carrier leak ratio α relevant to a total level is ensured as 60 dB.

In this way, in the case where the output level value A specified by the output level specifying means 29 is lower than a predetermined value, the level of the residual carrier Cc is very low relevant to the level of the digital modulation signal Sc outputted from the output terminal 20a, as shown in FIG. 4, by the level diagram switching means 32.

Therefore, in this case, the sensitivity measurement relevant to the measurement object 1 such as a receiving device can be precisely performed without being affected by the residual carrier Cc.

As shown in FIG. 3A and FIG. 3B, in the level diagrams taking carrier leak characteristics precedence over any other characteristics, the input signal level of the orthogonal modulator 24 is higher than −20 dBm.

Thus, a mutual modulation distortion Ra is generated at a comparatively high level (−50 dBm) with an output of the orthogonal modulator 24.

Moreover, the input signal level of the amplifier 27 is higher than −10 dBm, and thus, a mutual modulation distortion Rb of a level (−20 dBm) higher than such a gain is generated.

Hence, this mutual modulation distortion Rb is attenuated by means of the variable attenuator 28, and a mutual modulation distortion Rc of −140 dBm is outputted from the output terminal 20a.

Therefore, the adjacent channel leak ratio β in this level diagram is 40 dB (=−100−(−140)).

This mutual modulation distortion Rc leaks not only into a predetermined channel and but also into the adjacent channels to this predetermined channel, as shown in FIG. 4.

Hence, a level difference β' between individual modulation wave "m" and each distortion component superimposed on the wave is ensured by 40 dB, and the modulation precision is hardly affected.

Thus, the influence of a receiving device or the like upon the measurement object 1 in sensitivity measurement can be almost ignored.

In addition, in the case of performing distortion measurement or the like of the measurement object 1 such as an amplifier or mixer, the output level value A is specified as −10 (dBm), for example, by the output level specifying means 29.

At this time, judgment means 31 judges that the output level value A specified by −50 (dBm) that is a predetermined value is high.

Thus, the level diagram switching means 32 sets the level diagram inside of the apparatus so that a mutual modulation distortion is reduced, and the digital modulation signal of the specified level value A is outputted from the output terminal 20a.

Figure 5A:
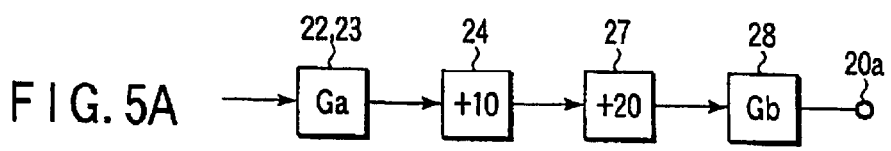
FIG. 5A and FIG. 5B are views each showing a level diagram with mutual modulation distortion characteristics taking precedence over any other characteristics according to the first embodiment.
Figure 5B:
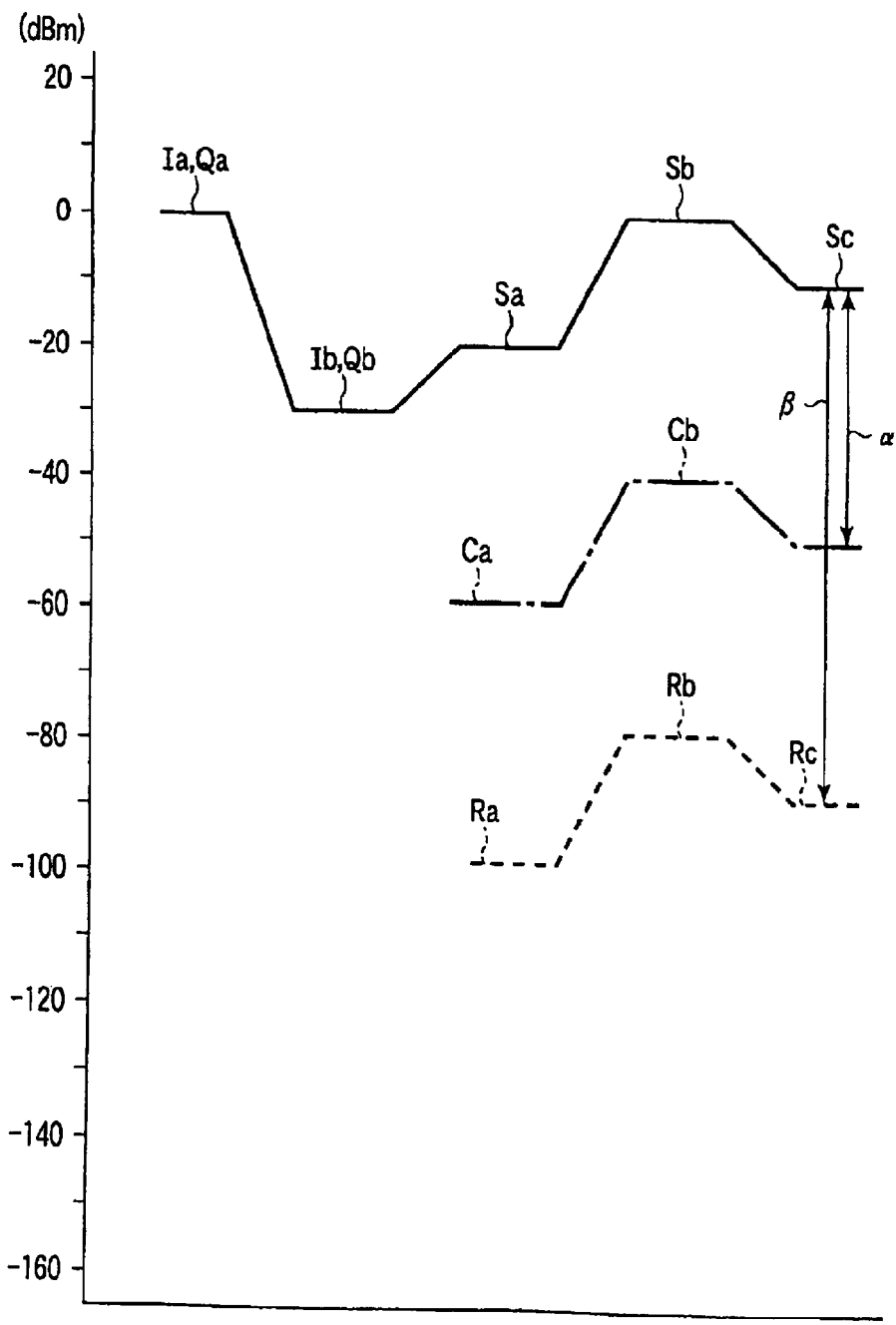

That is, as in the level diagrams shown in FIG. 5A and FIG. 5B, the attenuation quantity of the variable attenuators 22 and 23 is set to 30 dB, whereby the input level of the base band signals Ib and Qb relevant to the orthogonal modulator 24 is set to −30 dBm.

At this time, a total level of the digital modulation signal Sa outputted from the orthogonal modulator 24 is set to −20 dBm (=−30+10), and a level of the mutual modulation distortion Ra is −100 dBm, for example.

This digital modulation signal Sa is amplified to 0 dBm by means of the amplifier 27, and the amplified output Sb is inputted to the variable attenuator 28.

At this time, the level diagram switching means 32 sets the attenuation quantity of the variable attenuator 28 to 10 dB (=0−(−10)), whereby the level of the digital modulation signal Sc outputted from the output terminal 20a is set to −10 dBm that corresponds to the specified level A.

Here, the level of the digital modulation signal Sa inputted to the amplifier 27 is lower than −10 dBm, and thus, an increase in mutual modulation distortion caused by the amplifier 27 can be almost ignored.

In this manner, from the amplifier 27, there is generated a mutual modulation distortion Rb of −80 dBm obtained by amplifying the mutual modulation distortion Ra by 20 dB.

This mutual modulation distortion is attenuated by 10 dB by means of the variable attenuator 28, whereby a mutual modulation distortion Rc of −90 dBm is generated at the output terminal 20a.

Therefore, the adjacent channel leak ratio β at the output terminal 20a is 80 dB (=−10−(−90)), and there can be obtained a digital modulation signal when the adjacent channel leak ratio required for this measurement exceeds 70 dB.

Of the level diagrams shown in FIG. 5A and FIG. 5B, a level diagram from the base band signal generator 21 to an output of the amplifier 27 does not change in a range in which the output level value A specified by the output level specifying means 29 is higher than −50 (dBm).

That is, in this range, only the attenuation quantity of the variable attenuator 28 changes according to the specified level value A, and the adjacent channel leak ratio β is ensured by 80 dB.

Figure 6:
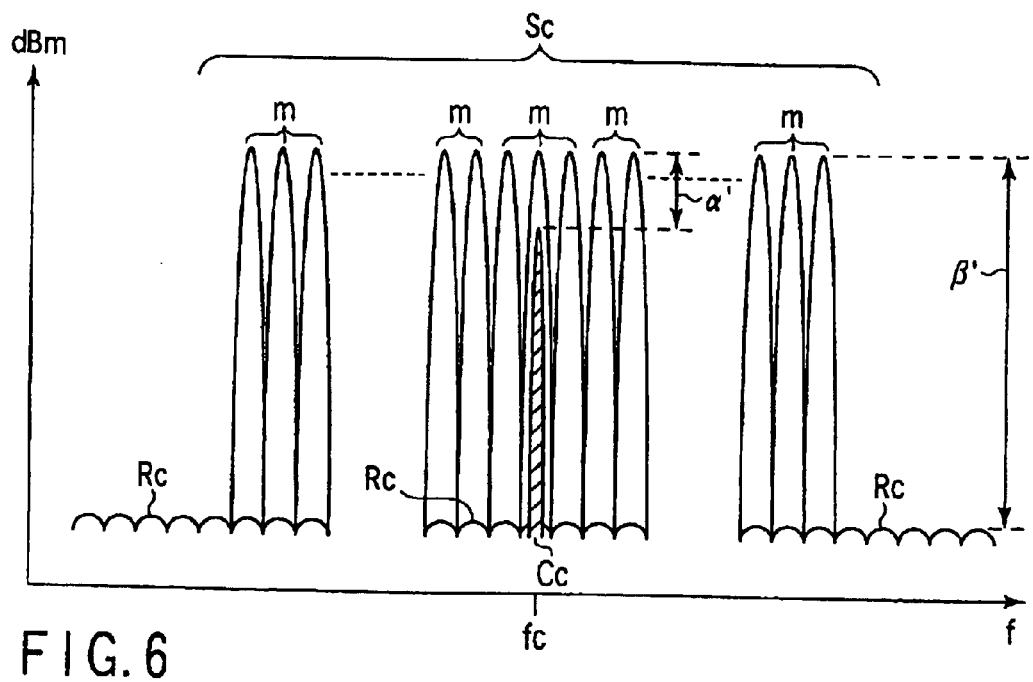
FIG. 6 is a view showing a spectrum of an output signal, with mutual modulation distortion characteristics taking precedence over any other characteristics according to the first embodiment.

In this way, in the case where the output level value A specified by the output level specifying means 29 is higher than a predetermined value, a difference β' between a level of each modulation wave "m" of the digital modulation signal Sc outputted from the output terminal 20a and a level of the mutual modulation distortion Rc that leaks into a predetermined channel and the adjacent channel is ensured by 80 dB by the level diagram switching means 32, as shown in FIG. 6.

Therefore, in this case, the measurement of characteristics of an amplifier or mixer and the like relevant to the measurement object 1 can be precisely performed without being affected by the mutual modulation distortion Rc.

As shown in FIG. 5A and FIG. 5B, in the level diagram with the mutual modulation distortion characteristics taking precedence over any other characteristics, the input signal level of the orthogonal modulator 24 is as low as −30 dBm.

Therefore, at the output terminal 20a, the carrier leak ratio α' relevant to a level of a modulation wave superimposed on the residual carrier is worsened as 10 dB, and the residual carrier Cc at its comparatively large level is generated as shown in FIG. 6.

Hence, the carrier leak ratio α relevant to a total level is ensured by 40 dB, and thus, the level of the residual carrier Cc is sufficiently smaller than a total level.

As a result, as in measurement of distortion characteristics of the amplifier or mixer or the like relevant to the measurement object 1, in measurement concerning a signal total level, an effect of the residual carrier Cc can be almost ignored.

(Second Embodiment)

In the meantime, in the digital modulation signal generating apparatus 20 according to the first embodiment, the input signal level of the orthogonal modulator 24 and amplifier 27 is determined by means of the variable attenuators 22 and 23 provided at the front stage of the orthogonal modulator 24.

Figure 7:
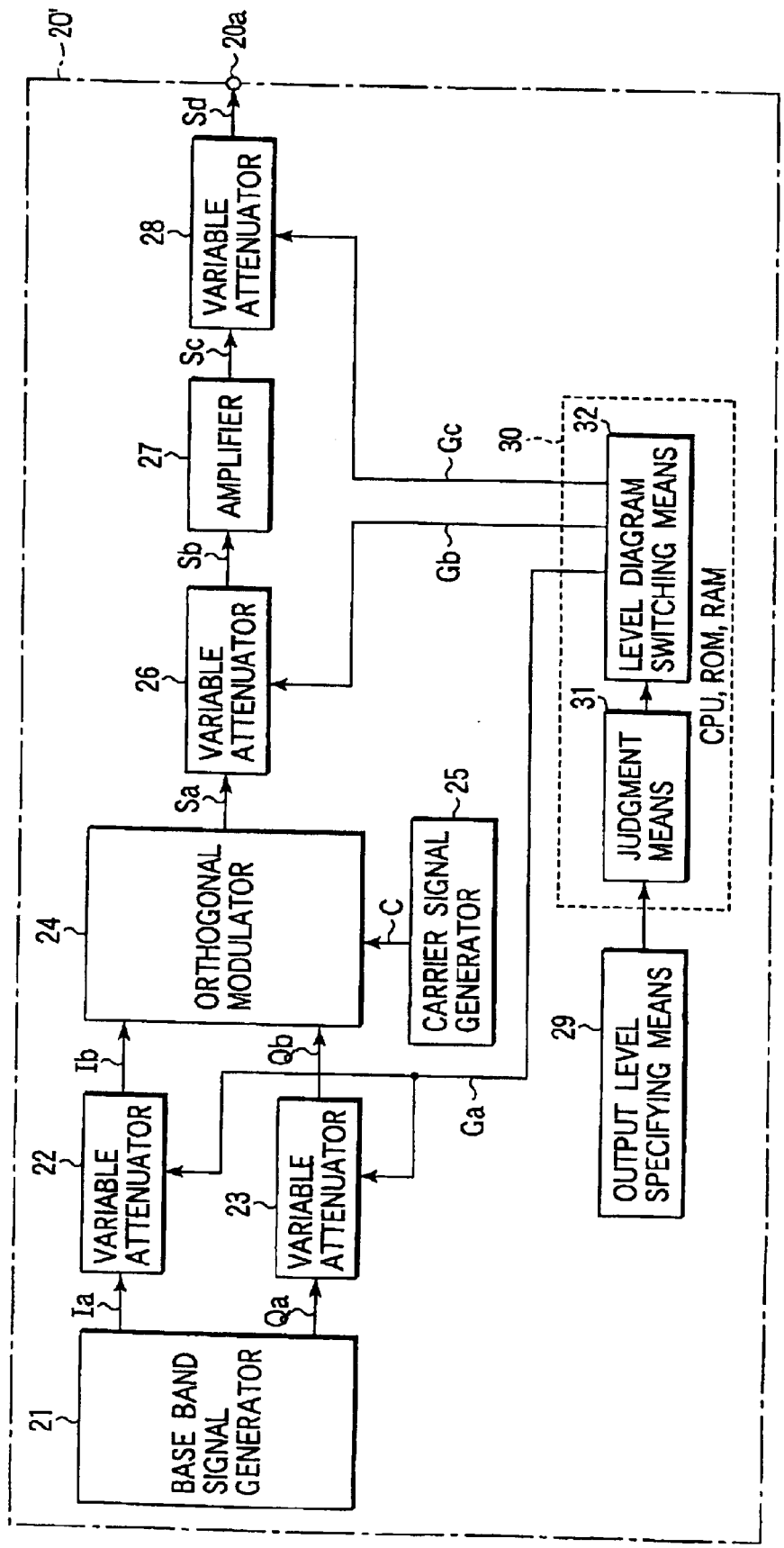
FIG. 7 is a block diagram depicting a configuration of a second embodiment of a digital modulation signal generating apparatus according to the present invention.

Hence, in a digital modulation signal generating apparatus 20' according to the second embodiment, as shown in FIG. 7, a variable attenuator 26 as second level varying means is provided between the orthogonal modulator 24 and the amplifier 27, as shown in FIG. 7.

This variable attenuator 26 is controlled by the level diagram switching means 32 together with the variable attenuators 22 and 23 as the first level varying means and the variable attenuator 28 as third level varying means.

In this manner, the variable attenuator 26 is provided at the front stage of the amplifier 27, whereby the variable attenuators 22 and 23 can be used independently for input level variation of the orthogonal modulator 24 and the variable attenuator 26 can be used for input level variation of the amplifier 27. Thus, the level control corresponding to each of the dynamic ranges of the orthogonal modulator 24 and the amplifier 27 can be performed.

For example, in the digital modulation signal generating apparatus 20 according to the first embodiment, when the dynamic range of the amplifier 27 is narrower than that of the orthogonal modulator 24, the range is restricted to the dynamic range of the amplifier 27, and the carrier leak ratio cannot be increased because the input level of the orthogonal modulator 24 cannot be increased.

Hence, in the digital modulation signal generating apparatus 20' according to the second embodiment, the variable attenuator 26 is provided at the front stage of the amplifier 27, whereby the carrier leak ratio can be further increased.

In the level diagram switching means 32, based on the output level value of the digital modulation signal specified by the output level specifying means 29 and the judgment result caused by the judgment means 31, the attenuation quantities Ga, Gb, and Gc of the variable attenuators 22 and 23 as the first level varying means, the variable attenuator 26 as second level means, and the variable attenuator 28 as third level varying means are set in accordance with the level diagram setting table stored in a ROM as shown in FIG. 13, for example, and the level diagram setting value computed based on the following formula by the CPU so as to be a predetermined attenuation quantity value which makes compatible desired carrier leak characteristics and desired mutual modulation distortion characteristics.

(1) The attenuation quantity of the variable attenuators 22 and 23 and the variable attenuator 26 is in accordance with the table shown in FIG. 13.

(2) Attenuation quantity (dB) of variable attenuator 28=−(attenuation quantity (dB) of variable attenuators 22 and 23)−(attenuation quantity (dB) of variable attenuator 26)−(specified output level value dBm)+30

Now, an operation of a digital orthogonal modulator signal generating apparatus 20' according to the second embodiment will be specifically described by employing numeric values.

In the digital modulation signal generating apparatus 20' according to the second embodiment, a presumed numeric value is selected as in the digital modulation signal generating apparatus 20 according to the first embodiment.

That is, the presumed numeric value is such that a level of the base band signals Ia and Qa outputted from the base band signal generator 21 is defined as 0 dBm; a level of a carrier signal outputted from the carrier signal generator 25 is defined as 10 dBm; a carrier suppression ratio of the orthogonal modulator 24 is defined as −70 dB; a gain of the orthogonal modulator 24 (a difference between a level of the base band signals Ib and Qb and a level of an output signal Sa) is defined as 10 dB; and a gain of the amplifier 27 is defined as 20 dB.

In addition, the mutual modulation distortion generated by the orthogonal modulator 24 is very low when its input signal level is lower than −20 dBm, and is gradually worsened in excess of −20 dBm.

Further, the mutual orthogonal modulator distortion generated by the amplifier 27 is very low when its input signal level is lower than −10 dBm, and is gradually worsened in excess of −10 dBm.

The judgment means 31 judges whether or not the level value A specified from the output level specifying means 29 is higher than −50 dBm that is a predetermined value.

Here, in order to perform sensitivity measurement or the like of a measurement object 1 such as a receiving device, the output level value A is specified as −100 (dBm), for example, by the output level specifying means 29.

At this time, the judgment means 31 judges that the output level value A specified by −50 (dBm) that is a predetermined value is low.

The level diagram switching means 32 sets the level diagram inside of the apparatus so that the carrier leak ratio is large, and a digital modulation signal of the specified output level value A is outputted from the output terminal 20a.

Figure 8A:
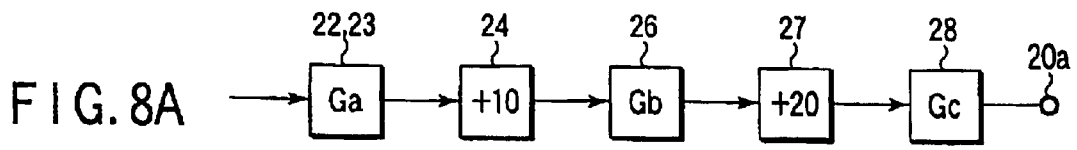
FIG. 8A and FIG. 8B are views each showing a level diagram with carrier leak characteristics taking precedence over any other characteristics according to the second embodiment.
Figure 8B:
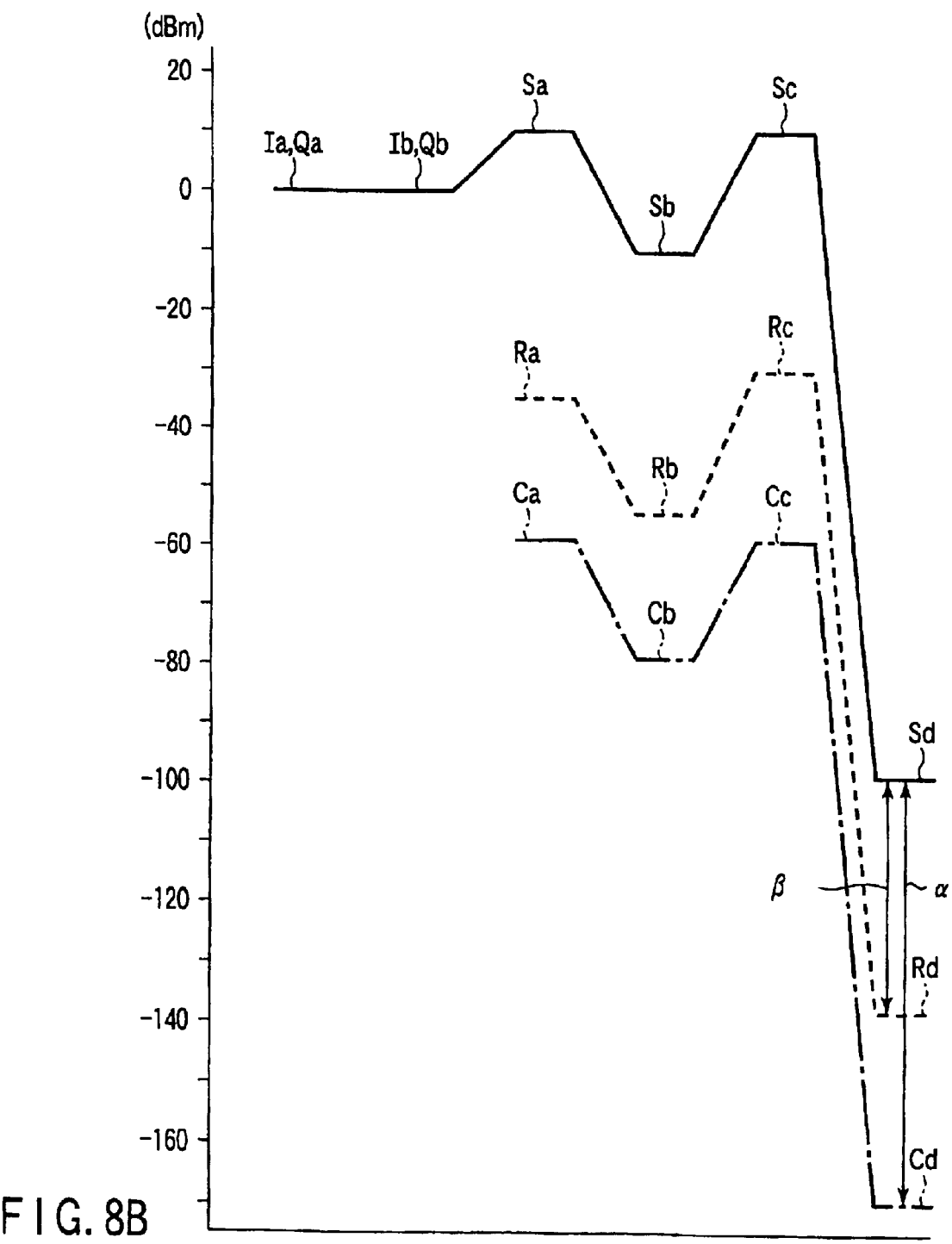

First, the level diagram switching means 32 sets the attenuation quantity Ga of the variable attenuators 22 and 23 to 0 dB, as shown in FIG. 8A and FIG. 8B, and set to 0 dBm an input level of the base band signals Ib and Qb relevant to the orthogonal modulator 24.

At this time, a total level of the digital modulation signal Sa outputted from the orthogonal modulator 24 is set to 10 dBm, and a level of the residual carrier Ca is set to −60 dBm.

The digital modulation signal Sa and the residual carrier Ca are inputted to the variable attenuator 26.

At this time, the level diagram switching means 32 sets the attenuation quantity Gb of the variable attenuator 26 to 20 dB, whereby the digital modulation signal Sa is attenuated to −10 dBm, the residual carrier Ca is attenuated to −80 dBm, and these signal and carrier are inputted to the attenuator 27.

The digital modulation signal Sb and residual carrier Cb attenuated by means of this variable attenuator 26 are amplified to 10 dBm and −70 dBm, respectively, by means of the attenuator 27, and the amplified outputs Sc and Cc are inputted to the variable attenuator 28.

At this time, the level diagram switching means 32 sets the attenuation quantity Gc of the variable attenuator 28 to 110 dB, and sets a level of the digital modulation signal Sd outputted from the output terminal 20a to −100 dBm that corresponds to the specified output level value A, whereby the level of the residual carrier Cd outputted from the output terminal 20a is attenuated to −170 dBm.

Figure 10:
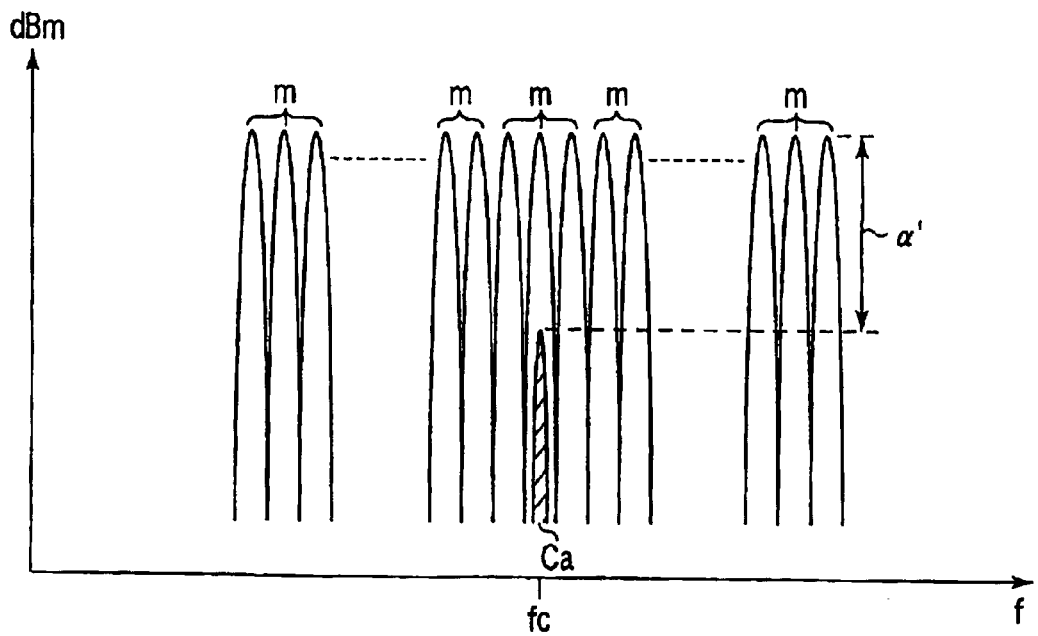
FIG. 10 is a view showing a spectrum of a digital signal according to a conventional OFDM modulation system.
Figure 11:
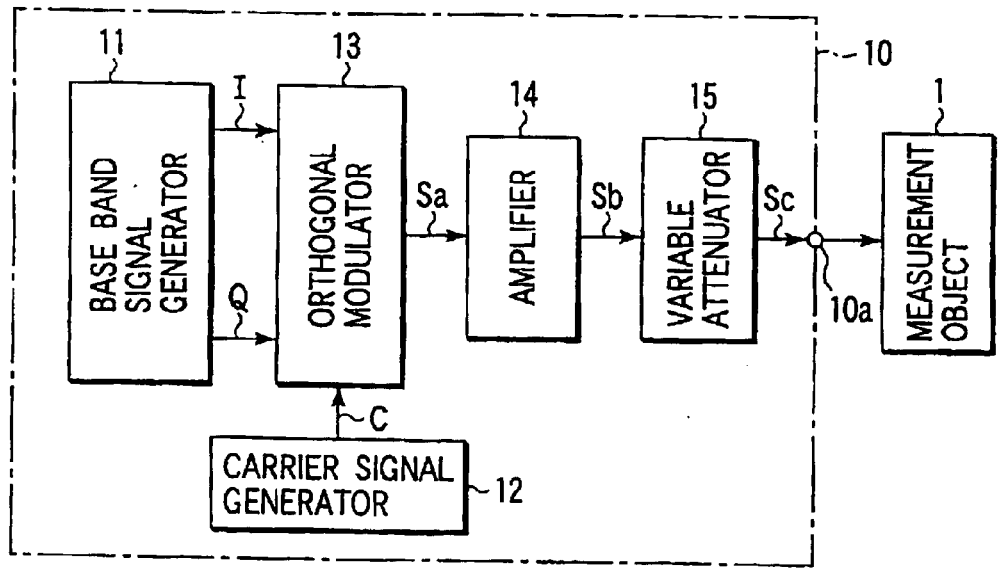
FIG. 11 is a block diagram depicting a configuration of a conventional digital modulation signal generating apparatus.

Therefore, a carrier leak ratio α relevant to a total level at the output terminal 20a is set to 70 dB, and a carrier leak ratio α' (see FIG. 4) relevant to a level of the modulation waves superimposed on the residual carrier is set to 40 dB a shown in FIG. 10.

In this manner, in the digital modulation signal generating apparatus 20' according to the second embodiment, there can be obtained the carrier leak ratio which is even higher than that of the digital modulation signal generating apparatus 20 according to the first embodiment. Thus, the sensitivity measurement relevant to the measurement object 1 such as receiving device can be performed more precisely.

In this way, in the level diagram of FIG. 8A and FIG. 8B in which carrier leak characteristics take precedence over any other characteristics, the input signal level of the orthogonal modulator 24 is higher, and the mutual modulation distortion Ra is generated at a higher level (−35 dBm).

Hence, the input signal level of the attenuator 27 is lowered to −10 dBm by means of the variable attenuator 27. Thus, the generation of the mutual modulation distortion caused by the attenuator 27 itself can be almost ignored.

In this manner, the mutual modulation distortion Rc of the output of the attenuator 27 can be set to −30 dBm, which is lower than a case of the digital modulation signal generating apparatus 20.

As a result, the adjacent channel leak ratio β at the output terminal 20a is set to 40 dB in the same manner as in the digital modulation signal generating apparatus 20, and an extreme increase in mutual modulation distortion caused by an input level increase can be suppressed.

In addition, in the case of performing distortion measurement or the like of the measurement object 1 such as amplifier or mixer, the output level value A is specified as −10 (dBm) by the output level specifying means 29.

At this time, the judgment means 31 judges that the level value A specified by −50 (dBm) that is a predetermined value is high.

The level diagram switching means 32 sets a level diagram inside of the apparatus so that the mutual modulation distortion is reduced, and a digital modulation signal of the specified output level value A is outputted from the output terminal 20a.

Figure 9A:
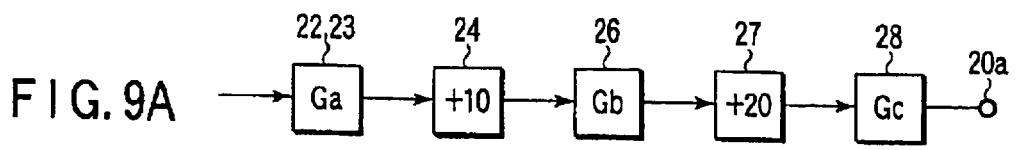
FIG. 9A and FIG. 9B are views showing a level diagram with mutual modulation distortion characteristics taking precedence over any other characteristics according to the second embodiment.
Figure 9B:
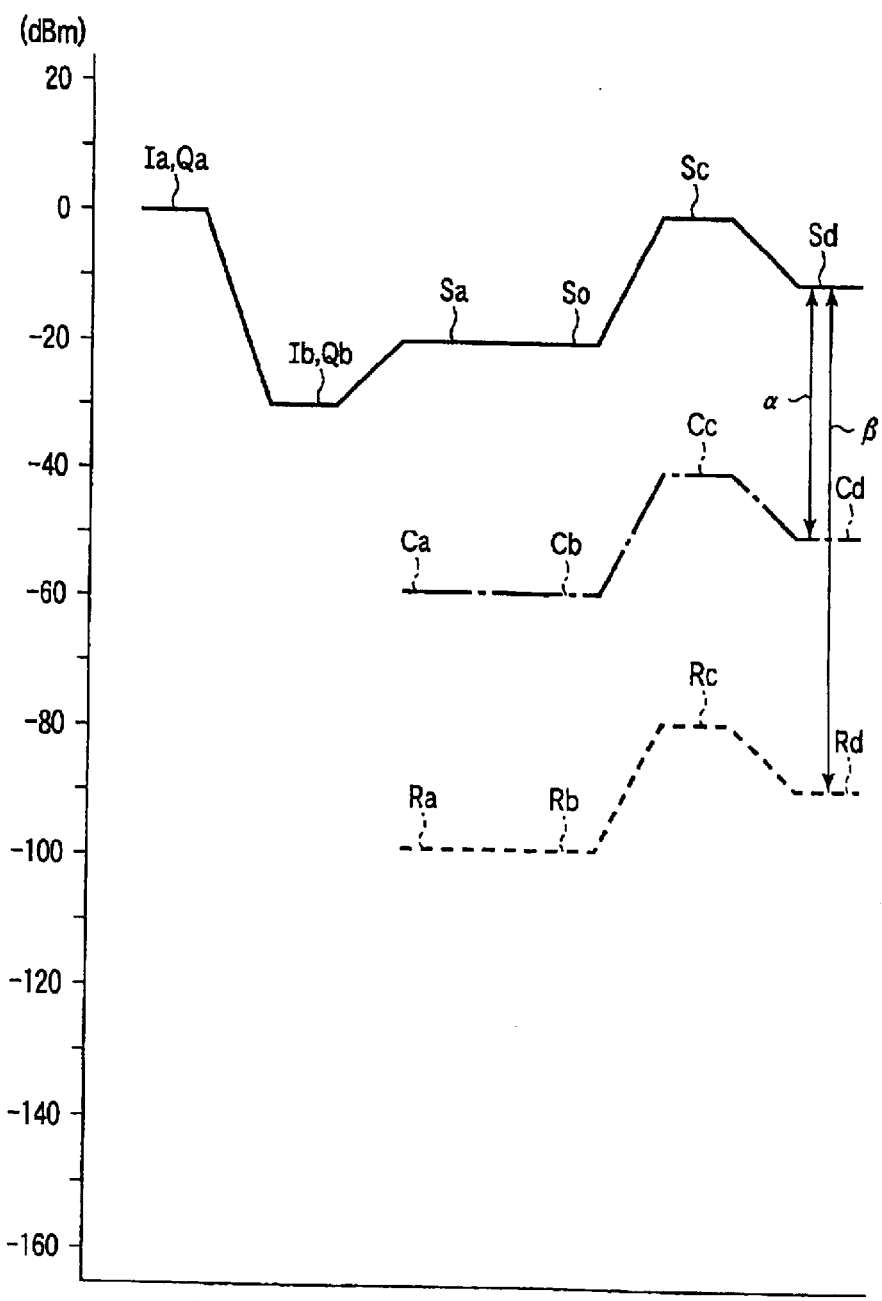

First, the level diagram switching means 32 sets the attenuation quantity Ga of the variable attenuators 22 and 23 to 30 dB, as shown in FIG. 9A and FIG. 9B, whereby the input level of the base band signals Ib and Qb relevant to the orthogonal modulator 24 is set to −30 dBm.

At this time, the total level of the digital modulation signal Sa outputted from the orthogonal modulator 24 is set to −20 dBm, and the mutual modulation distortion Ra of the orthogonal modulator 24 is set to −100 dBm, similarly.

This digital modulation signal Sa and mutual modulation distortion Ra are inputted to the variable attenuator 26.

At this time, the level diagram switching means 32 sets the attenuation quantity of the variable attenuator 26 to 0 dB, whereby the − digital modulation signal Sb of 20 dB and the residual carrier Cb of −100 dBm are inputted to the amplifier 27.

In the level diagrams shown in FIG. 8A and FIG. 8B, an input signal level of the orthogonal modulator 24 is higher, and thus, the mutual modulation distortion Ra is generated at a higher level (−35 dBm).

Hence, the input signal level of the amplifier 27 is reduced to −10 dBm by means of the variable attenuator 26. Thus, the generation of a mutual modulation distortion caused by this amplifier 27 itself can be almost ignored.

In addition, the mutual modulation distortion Rc of an output of the amplifier 27 can be reduced to −30 dBm, which is lower than a case of the signal generating apparatus 20.

As a result, the adjacent channel leak ratio β at the output terminal 20a is set to 40 dB in the same manner as in the case of the digital modulation signal generating apparatus 20, and an extreme increase in mutual modulation distortion caused by an input level increase can be restricted.

In addition, in the case of performing distortion measurement or the like of the measurement object 1 such as an amplifier or mixer, the output level value A is specified as −10 (dBm) by the output level specifying means 29.

At this time, the judgment means 31 judges that the output level value A specified by −50 (dBm) that is a predetermined value is high.

The level diagram switching means 32 sets the level diagram inside of the apparatus so that the mutual modulation distortion is reduced, and the digital modulation signal of the specified output level value A is outputted from the output terminal 20a.

First, the level diagram switching means 32 sets the attenuation quantity Ga of the variable attenuators 22 and 2 to 30 dB, as shown in FIG. 9A and FIG. 9B, whereby the input level of the base band signals Ib and Qb relevant to the orthogonal modulator 24 is set to −30 dBm.

At this time, a total level of the digital modulation signal Sa outputted from the orthogonal modulator 24 is set to −20 dBm, and the mutual modulation distortion Ra of the orthogonal modulator 24 is set to −100 dBm in the same way as previously.

The digital modulation signal Sa and the mutual modulation distortion Ra are inputted to the variable attenuator 26. At this time, the level diagram switching means 32 sets the attenuation quantity of the variable attenuator 26 to 0 dB, and the digital modulation signal Sb of −20 dBm and the residual carrier Cb of −100 dBm are inputted to the amplifier 27.

This digital modulation signal Sb is amplified to 0 dBm by means of the amplifier 27, and its amplified output Sc is inputted to the variable attenuator 28.

In addition, as described previously, the input signal level of the amplifier 27 is as low as −20 dBm, and thus, the mutual modulation distortion generated by the amplifier 27 itself can be ignored. From the amplifier 27, the mutual modulation distortion Rc of −80 dBm is outputted, and is inputted to the variable attenuator 28.

At this time, the level diagram switching means 32 sets the attenuation quantity Gc of the variable attenuator 28 to 10 dB, and the level of the digital modulation signal Sd outputted from the output terminal 20a is set to −10 dBm that corresponds to the specified output level value A.

In addition, the mutual modulation distortion Rd outputted from the output terminal 20a is set to −90 dBm due to the attenuation caused by the variable attenuator 28.

Therefore, the adjacent channel leak ratio β at the output terminal 20a is set to 100 dB in the same way as previously, and measurement of the distortion characteristics of an amplifier or mixer and the like relevant to the measurement object 1 can be precisely performed without being affected by this mutual modulation distortion.

In the level diagram shown in FIG. 9A and FIG. 9B with the mutual modulation distortion characteristics taking precedence over any other characteristics, the input signal level of the orthogonal modulator 24 is low, and thus, the levels of the residual carriers Ca, Cb, Cc, and Cd are high.

However, the carrier leak ratio α relevant to a total level is ensured by 40 dB. In the same manner as previously, an effect of measurement of distortion characteristics relevant to the measurement object 1 such as amplifier or mixer with respect to a signal total level can be almost ignored.

In the foregoing digital modulation signal generating apparatuses 20 and 20', the judgment means 31 judges whether or not the output level value A specified from the output level specifying means 29 is higher than a predetermined value (−50 dBm) so that the level diagram in the apparatus is varied.

Hence, for example, in the case where a range of −40 to −60 (dBm) is defined as a predetermined range, and the specified output level value A is lower than this predetermined range, there may be employed a level diagram with carrier leak characteristics taking precedence over any other characteristics in the same way as previously. In the case where the above range is higher than the predetermined range, there may be employed a level diagram with mutual modulation distortion characteristics taking precedence over any other characteristics in the same manner as previously.

In this case, when the specified output level value A is within a predetermined range, the attenuation quantity (or gain) of the variable attenuators 22 and 23 in the case of the digital modulation signal generating apparatus 20 and the attenuation quantity (or gains) of the variable attenuators 22 and 23, and the attenuation quantity of the variable attenuator 26 in the case of digital modulation signal generating apparatus 20' are set to values between a value obtained when carrier leak characteristics precedes any other characteristics and a value obtained when mutual modulation distortion characteristics precedes any other characteristics, whereby the carrier leak characteristics and mutual modulation distortion characteristics are controlled to be placed in a comparatively good state.

As has been described above, according to the first aspect of the present invention, there is provided a digital modulation signal generating apparatus, wherein first level varying means is provided between a base band signal generator and an orthogonal modulator; second level varying means is provided between an amplifier and an output terminal; it is judged whether or not an output level value specified by output level specifying means is higher than a predetermined value or a predetermined range; when it is judged that the specified output level value is lower than the predetermined value or the predetermined range, the first level varying means is set so that a level difference between a digital modulation signal outputted from an output terminal and a residual carrier is equal to or larger than a predetermined value, and an attenuation quantity of the second level varying means is set so that a digital modulation signal of the specified output level value is outputted from an output terminal; when the specified output level value is higher than the predetermined value or the predetermined range, the first level varying means is set so that a level difference between a digital modulation signal outputted from an output terminal and a mutual modulation distortion is equal to or larger than the predetermined value or range; and an attenuation quantity of the second level varying means is set so that a digital modulation signal of the specified output level value is outputted from an output terminal.

Thus, in the case where a low output level is specified in order to perform sensitivity measurement, such as a receiving device, a digital modulation signal can be output such that carrier leak characteristics suitable to such sensitivity measurement are very good. In the case where a high output level is specified in order to perform distortion measurement such as an amplifier or mixer, a digital modulation signal can be output such that mutual modulation distortion characteristics suitable to the distortion characteristics or the like are very good. Thus, carrier leak characteristics and mutual modulation distortion characteristics can be compatible with each other at a high level.

According to the second aspect of the present invention, there is provided a digital modulation signal generating apparatus, wherein first level varying means is provided between a base band signal generator and an orthogonal modulator; second level varying means is provided between an orthogonal modulator and a modulator; third level varying means is provided between an amplifier and an output terminal; it is judged whether or not an output level value specified by output level specifying means is higher than a predetermined value or a predetermined range; when it is judged that the specified output level value is lower than the predetermined value or predetermined range, the first level varying means is set so that a level difference between a digital modulation signal outputted from an output terminal and a residual carrier is equal to or larger than the predetermined value or range, and the second level varying means and third level varying means are set so that the digital modulation signal of the specified output level value is outputted from the output terminal; and when it is judged that the specified output level value is higher than the predetermined value or predetermined range, the first level varying means and second level varying means are set so that a level difference between the digital modulation signal outputted from the output terminal and the mutual modulation distortion is equal to or larger than the predetermined value or range, and the third level varying means is set so that the digital modulation signal of the specified output level value is outputted from the output terminal.

Thus, in the case where a low output level is specified in order to perform sensitivity measurement such as a receiving device, a digital modulation signal can be outputted such that carrier leak characteristics suitable to the sensitivity measurement or the like are very good. In the case where a high output level is specified in order to perform distortion measurement such as an amplifier or mixer, a digital modulation signal can be outputted such that mutual modulation distortion characteristics suitable to those distortion characteristics or the like are very good. Moreover, there are provided independent level varying means at the front stage of each of the orthogonal modulator and amplifier. Thus, the input signal level of the orthogonal modulator can be increased without being limited by the amplifier characteristics, and the carrier leak characteristics and mutual modulation distortion characteristics can be compatible with each other at a high level.

Therefore, according to the present invention as has been described above, the problems in the prior art are solved, and there can be provided a digital modulation signal generating apparatus capable of making compatible with each other the carrier leak characteristics of the generated digital modulation signal and the mutual modulation distortion characteristics at a high level.

What is claimed is:

1. A digital modulation signal generating apparatus, comprising:

a band signal generator which generates a base band signal;

a carrier signal generator which generates a carrier signal;

an orthogonal modulator which generates a digital modulation signal of a predetermined channel that corresponds to a frequency of the carrier signal upon receipt of the base band signal generated by the base band signal generator and the carrier signal generated by the carrier signal generator;

an amplifier which amplifies the digital modulation signal generated by the orthogonal modulator;

an output terminal which outputs the digital modulation signal amplified by the amplifier;

a first level varying member provided between the base band signal generator and the orthogonal modulator, which varies a level of the base band signal, and inputs the base band signal which has had the level varied to the orthogonal modulator;

a second level varying member provided between the amplifier and the output terminal, which attenuates and varies a level of an output signal output from the amplifier, and outputs the output signal which has had the level attenuated and varied from the output terminal;

output level specifying member which specifies an output level value of the digital modulation signal output from the output terminal;

a judgment section which judges whether or not the output level value of the digital modulation signal specified by the output level specifying member is higher than a predetermined value or a predetermined range; and a level diagram switching section which sets the first level varying member and the second level varying member so that the digital modulation signal output from the output terminal is a predetermined attenuation quantity value which makes desired carrier leak characteristics compatible with desired mutual modulation distortion characteristics, respectively, based on the output level value of the digital modulation signal specified by the output level specifying member and a judgment result caused by the judgment member.

2. A digital modulation signal generating apparatus according to claim 1, wherein said level diagram switching member is adopted to switch a level diagram inside of the apparatus between a state in which carrier leak characteristics precedes mutual modulation distortion characteristics and a state in which mutual modulation distortion characteristics precedes carrier leak characteristics according to the output level value of the digital modulation signal output from said output terminal specified by said output level specifying member and a judgment result of said judgment member.

3. A digital modulation signal generating apparatus according to claim 2, wherein said level diagram switching section is adopted to set an attenuation quantity of said first level varying member to be small so that a level difference between the digital modulation signal of the predetermined channel output from said output terminal and a residual carrier is equal to or larger than a predetermined value in the case where the output level value specified by said output level specifying member is lower than the predetermined value or predetermined range by said judgment section, and to set an attenuation quantity of said second level varying member so that the digital modulation signal of the predetermined channel of the output level value specified by said output level specifying member is output from said output terminal.

4. A digital modulation signal generating apparatus according to claim 2, wherein said level diagram switching section is adopted to set an attenuation quantity of said first level varying member to be small so that a level difference between the digital modulation signal of the predetermined channel output from said output terminal and a mutual modulation distortion is equal to or larger than a predetermined value when it is judged that an output level value specified by said output level specifying member is higher than a predetermined value or a predetermined range by said judgment section, and to set an attenuation quantity of said second level varying member so that the digital modulation signal of the predetermined channel of the output level value specified by said output level specifying member is output from said output terminal.

5. A digital modulation signal generating apparatus according to claim 2, wherein said level diagram switching section is adopted to set said first level varying member so that a level difference between the digital modulation signal output from said output terminal and a residual carrier contained therein is equal to or larger than a predetermined value or range by said judgment section when it is judged that an output level value specified by said output level specifying member is lower than the predetermined value or predetermined range; to set said second level varying member so that the digital modulation signal of said specified level value is output from said output terminal; to set said first level varying member so that a level of the digital modulation signal output from said output terminal and a level of the mutual modulation distortion contained therein are equal to or larger than a predetermined value when it is judged that said specified level value is higher than said predetermined value or said predetermined range; and to set said second level varying member means so that a digital modulation signal of said specified level value is output from said output terminal.

6. A digital modulation signal generating apparatus according to claim 1, wherein said digital modulation signal generating apparatus further comprises a computation section which computes a predetermined attenuation quantity value for said first level varying member and said second level varying member set by said level diagram switching section based on the output level value of the digital modulation signal specified by at least said output level specifying member and the judgment result caused by said judgment section.

7. A digital modulation signal generating apparatus according to claim 1, wherein said digital modulation signal generating apparatus further comprises a storage section which stores in advance in a table format a predetermined attenuation quantity value for the first level varying member and the second level varying member set by said level diagram switching section.

8. A digital signal generating apparatus comprising:

a base band signal generator which generates a base band signal;

a carrier signal generator which generates a carrier signal;

an orthogonal modulator which generates a digital modulation signal of a predetermined channel that corresponds to a frequency of the carrier signal upon the receipt of the base band signal generated by the base band signal generator and the carrier signal generated by the carrier signal generator;

an amplifier which amplifies the digital modulation signal generated by the orthogonal modulator;

an output terminal which outputs the digital modulation signal amplified by the amplifier;

a first level varying member provided between the base band signal generator and the orthogonal modulator, which varies a level of the base band signal, and inputs the base band signal which has had the level varied to the orthogonal modulator;

a second level varying member provided between the orthogonal modulator and the amplifier, which attenuates and varies a level of the digital modulation signal outputted from the orthogonal modulator, and inputs the digital modulation signal which has had the level attenuated and varied to the amplifier;

a third level varying member provided between the amplifier and the output terminal, which attenuated and varied a level of an output signal output from the amplifier, and outputs the output signal which has had the level attenuated and varied from the output terminal;

an output level specifying member which specifies an output level value of the digital modulation signal output from the output terminal;

a judgment section which judges whether or not the output level value of the digital modulation signal specified by the output level specifying member is higher than a predetermined value or a predetermined range; and a level diagram switching section which sets the first level varying member, said second level varying member, and said third level varying member to a predetermined attenuation value, respectively, so that the digital modulation signal output from the output terminal makes desired carrier leak characteristics compatible with desired mutual modulation distortion characteristics based on the output level value of the digital modulation signal specified by the output level specifying member and a judgment result caused by the judgment section.

9. A digital modulation signal generating apparatus according to claim 8, wherein said level diagram switching section is adopted to switch a level diagram inside of the apparatus between a state in which carrier leak characteristics precedes mutual modulation distortion characteristics and a state in which mutual modulation distortion characteristics precedes carrier leak characteristics according to the output level value of the digital modulation signal output from said output terminal specified by said output level specifying section and the judgment result of said judgment section.

10. A digital modulation signal generating apparatus according to claim 8, wherein said level diagram switching section is adopted to set an attenuation quantity of said first level varying member to be small so that a level difference between the digital modulation signal of the predetermined channel output from said output terminal and a residual carrier is equal to or larger than a predetermined value when it is judged that the output level value specified by said output level specifying member is lower than the predetermined value or the predetermined range by said judgment section, to set an automation quantity of said second level varying member to be large so that a level difference between the digital modulation signal of the predetermined channel output from said output terminal and a residual carrier is equal to or larger than a predetermined value, and to set an attenuation quantity of said third level varying member so that the digital modulation signal of the predetermined channel of the output level value specified by said output level specifying section is output from said output terminal.

11. A digital modulation signal generating apparatus according to claim 8, wherein said level diagram switching section is adopted to set an attenuation quantity of said first level varying member to be large so that a level difference between the digital modulation signal of the predetermined channel output from said output terminal and a mutual modulation distortion is equal to or larger than a predetermined value when it is judged that an output level value specified by said output level specifying member is higher than the predetermined value or the predetermined range by said judgment section, to set an attenuation quantity of said second level varying member to be large so that a level difference between the digital modulation signal of the predetermined channel output from said output terminal and a mutual modulation distortion is equal to or larger than a predetermined value, and to set an attenuation quantity of said third level varying member so that the digital modulation signal of the predetermined channel of the output level value specified by said output level specifying member is output from said output terminal.

12. A digital modulation signal generating apparatus according to claim 8, wherein said level diagram switching section is adopted to set said first level varying member section and said second level varying member so that a level difference between the digital modulation signal output from said output terminal and a mutual modulation distortion is equal to or larger than a predetermined value when it is judged that an output level value specified by said output level specifying member is lower than the predetermined value or the predetermined range; to set said third level varying member so that the digital modulation signal of said specified level value is output from said output terminal; to set said first level varying member and said second level varying member so that a level difference between the digital modulation signal output from said output terminal and the mutual modulation distortion contained therein is equal to or larger than a predetermined value when it is judged that said specified level value is higher than said predetermined value or said predetermined range; and to set said third level varying member so that the digital modulation signal of said specified level value is output from said output terminal.

13. A digital modulation signal generating apparatus according to claim 8, wherein said digital modulation signal generating apparatus further comprises a computation section which computes a predetermined attenuation quantity value for said first level varying member, said second level varying member, and said third level varying member set by said level diagram switching section based on the output level value of the digital modulation signal specified by at least said output level specifying member and the judgment result caused by said judgment section.

14. A digital modulation signal generating apparatus according to claim 8, wherein said digital modulation signal generating apparatus further comprises a storage section which stores in advance in a table format a predetermined attenuation quantity value for the first level varying member, the second level varying member, and the third level varying member set by said level diagram switching section.

* * * * *